United States Patent
Vogel et al.

(10) Patent No.: US 11,913,583 B2
(45) Date of Patent: Feb. 27, 2024

(54) COUPLING INTENDED FOR AN AIR MOTOR

(71) Applicants: AIR-tec-Vogel GmbH, Staufenberg (DE); Freund Maschinenfabrik GmbH & Co. KG, Paderborn (DE)

(72) Inventors: Jörg Vogel, Staufenberg (DE); Christian Scheer, Lauenförde (DE)

(73) Assignees: AIR-TEC-VOGEL GMBH, Staufenberg (DE); FREUND MASCHINENFABRIK GMBH & CO. KG, Paderborn (DE)

( * ) Notice: Subject to any disclaimer, the term of this patent is extended or adjusted under 35 U.S.C. 154(b) by 128 days.

(21) Appl. No.: 17/574,800

(22) Filed: Jan. 13, 2022

(65) Prior Publication Data

US 2022/0228687 A1 Jul. 21, 2022

(30) Foreign Application Priority Data

Jan. 15, 2021 (DE) ...................... 20 2021 100 170.4
Dec. 28, 2021 (DE) ...................... 10 2021 006 376.7

(51) Int. Cl.
 *F16L 37/42* (2006.01)
(52) U.S. Cl.
 CPC .................................. *F16L 37/42* (2013.01)
(58) Field of Classification Search
 CPC . F16L 37/42; F16L 37/40; F16L 29/02; F16L 19/0206; F16L 37/565
 See application file for complete search history.

(56) References Cited

U.S. PATENT DOCUMENTS

| 2,628,850 A | 2/1953 | Summerville |
| 2,805,089 A * | 9/1957 | Hansen ................. F16L 37/088 285/317 |

(Continued)

FOREIGN PATENT DOCUMENTS

| DE | 1 756 105 U1 | 11/1957 |
| DE | 68 09 307 U1 | 4/1969 |
| DE | 2443249 A1 | 3/1975 |

OTHER PUBLICATIONS

English Translation of the Descriptive portion of DE6809307, retrieved on Jul. 12, 2023, from the EPO.*

(Continued)

*Primary Examiner* — Zachary T Dragicevich
*Assistant Examiner* — James A Linford
(74) *Attorney, Agent, or Firm* — LADAS & PARRY LLP; Malcolm J. MacDonald, Esq.

(57) ABSTRACT

A coupling for connecting a compressed air source to an air motor, having a housing with a housing channel leading to a compressed air connection and a piston axially adjustable in the housing channel- and force-loaded by a spring element having a piston channel which, when the coupling is connected to the air motor, merges into a connecting channel present in a pin element of the air motor. The piston is adjustable in the direction of the compressed air connection by the pin element against the force applied by the spring element. The spring element runs between the compressed air connection and the compressed air connection side area of the piston. Radial openings extend from the compressed air connection side area of the piston channel. An exhaust air channel connected to the air motor extends in the wall of the housing.

15 Claims, 6 Drawing Sheets

(56) References Cited

U.S. PATENT DOCUMENTS

| | | | | | |
|---|---|---|---|---|---|
| 3,336,053 | A | * | 8/1967 | Carse | B67D 1/0835 |
| | | | | | 251/149.6 |
| 4,660,803 | A | * | 4/1987 | Johnston | F16L 37/22 |
| | | | | | 285/24 |
| 4,863,201 | A | * | 9/1989 | Carstens | F16L 37/42 |
| | | | | | 285/308 |
| 4,967,999 | A | * | 11/1990 | Otsuki | F16L 37/42 |
| | | | | | 251/149.7 |
| 4,989,831 | A | * | 2/1991 | Ootsuki | F16L 37/42 |
| | | | | | 251/149.7 |
| 9,528,650 | B2 | | 12/2016 | Tiberghien et al. | |
| 2020/0132233 | A1 | | 4/2020 | Taguchi et al. | |

OTHER PUBLICATIONS

English Translation of the Claims portion of DE6809307, retrieved on Jul. 12, 2023, from the EPO.*
European Search Report, dated Jun. 2, 2022, corresponding to European Application 22151410.2.

* cited by examiner

COUPLING INTENDED FOR AN AIR MOTOR

SUMMARY OF THE INVENTION

The invention relates to a coupling for connecting a compressed air source to an air motor, comprising a housing with a housing channel leading to a compressed air connection, a piston axially adjustable in the housing channel and force-loaded by a spring element and has an axially extending piston channel which, when the coupling is connected to the air motor, merges into a connecting channel present in a pin element of the air motor, wherein the piston is adjustable in the direction of the compressed air connection by means of the pin element against the force applied by the spring element, wherein, in the absence of interaction between the pin element and the piston, the piston is in a first position due to the force applied by the spring element, in which the housing channel is shut off relative to the piston channel by means of a first seal extending between the piston and the housing channel, and, when the coupling is connected to the air motor, in a second position of the piston there is a compressed air connection between the housing channel, the piston channel and the connecting channel.

BACKGROUND OF THE INVENTION

Air motors are used, for example, to drive tools. If these are made of stainless steel, they are particularly suitable for use in the food and chemical industries, as they meet hygienic requirements and operate reliably. For cleaning, such as disinfecting, the housing of corresponding air motors, the connection to the compressed air source must be removed. This is often time consuming. The same applies to the case when one compressed air supply is to be used for several air motors.

DE 1 756 105 U1 describes a complex self-closing valve for compressed air lines which has a spherical valve body with a conical extension, wherein a seal runs between the extension and the body. The valve body is connected to a sleeve. A spring element acts on the sleeve and is supported between a housing part and a shoulder extending from the sleeve. The sleeve is guided by sections of housing parts that can be assembled.

DE 68 09 307 U1 provides for a compressed air coupling attached to a wall or a ceiling, which is connected via a hose to a compressed air tool using a bayonet catch, by means of which a compressed air channel is released.

It is therefore the object of the present invention to provide a coupling for an air motor which allows both rapid disconnection and connection to a source of compressed air without any disadvantages in supplying the compressed air. The coupling should be alignable to an air motor to the desired extent, i.e. the coupling should be variably positionable.

According to another aspect, it should be possible to selectively lead the exhaust air away.

It should also open up the possibility of achieving a reduction in the sound level, which is quite high in air motors.

For solving the object, the invention essentially provides that the spring element runs between the compressed air connection and the compressed air connection side area of the piston, that radially running openings, via which the compressed air flows in the second position of the piston, start from the compressed air connection side area of the piston channel, that at least one exhaust air channel connected to the compressed air motor runs in the wall of the housing and passes through the wall in its compressed air connection side area, in particular the end face of the housing.

In particular, the invention also relates to a coupling for connecting a compressed air source to a compressed air motor, comprising a housing with a housing channel leading to a compressed air connection, a piston axially adjustable in the housing channel and force-loaded by a spring element, having an axially extending piston channel which, when the coupling is connected to the compressed air motor, merges into a connecting channel present in a pin element of the compressed air motor, wherein the piston is adjustable in the direction of the compressed air connection against the application of force by the spring element, wherein, in the absence of interaction between the pin element and the piston, the piston is in a first position due to the application of force by the spring element, in which the housing channel is shut off with respect to the piston channel by means of a first seal extending between the piston and the housing channel, and, with the coupling connected to the air motor, in a second position of the piston there is a compressed air connection between the housing channel, wherein the coupling is characterized in that the piston has a first section running on the compressed air motor side and a second section running on the compressed air connection side, in that the first section has a cylinder geometry on the outside and the piston channel runs inside it, in that the second section has a larger cross section compared to the first section and runs at a distance from the inner surface of the housing channel, in that the spring element is supported on the one hand on the compressed air connection side, preferably on the compressed air connection, and on the other hand on the first section, in that a first seal runs in the second section or in the transition region between the first and second sections, in that the housing channel has a contact surface, in that the first seal engages with the contact surface in the absence of interaction between the pin element and the piston and in that the piston channel has, in its compressed air connection side area, radially running openings which run with respect to the contact surface in such a way that, when the seal is not engaged with the contact surface, there is a connection between the housing channel and the piston channel, and when the seal is engaged with the contact surface, the connection is blocked.

According to the invention, a coupling is proposed which can be connected to an air motor, wherein the housing of the coupling has a compressed air connection and within the housing a piston is adjustable, which in a first position, in which the housing, i.e. the coupling, is disconnected from the motor connection, shuts off compressed air present in the housing, and in a second position, in which there is a connection to the air motor, the compressed air can flow to the air motor.

In particular, it is provided that the housing has at least one, preferably two, connections running in the direction of the longitudinal axis, such as channels or bores in the housing wall, via which exhaust air coming from the air motor is led away. Preferably, the removal is carried out via a hose, e.g. having a length of more than two, preferably more than three meters, connected to a muffler in order to achieve noise reduction. This has the advantage that the exhaust air from the air motor does not flow out directly in the region of the air motor, which would cause undesirable noise.

In order to optionally shut off the compressed air or connect it to the air motor, the first seal, which in particular extends from the piston, either engages or is spaced from a contact surface formed in the inner surface of the housing. In this region, the piston runs at a distance from the inner surface of the housing, virtually forming an annular space to allow compressed air to flow to the required extent.

The fact that the spring element acts on the end region of the piston on the compressed air connection side results in a simple design, in particular simple insertion and replacement of the spring element. The housing does not have to be taken apart. Rather, it is only necessary to disconnect the air pressure connection from the housing.

In particular, it is provided that the contact surface has a cone shape, i.e. the geometry of a cone.

Furthermore, it should be particularly emphasized that the piston consists of a first section extending on the air motor side with a cylinder geometry and a second section extending on the compressed air connection side, which is widened compared to the first section, i.e. has an effective cross-section that is larger than that of the first section.

The first seal can start from the second section. In particular, however, it is provided that the first seal extends in the transition region between the first and second sections, in particular in a groove via which the first section merges into the second section.

It should also be emphasized that the second section in longitudinal section preferably has a T-geometry with a transverse leg on whose surface on the compressed air connection side the spring element is supported with one of its ends. The other end of the spring element, which is in particular a helical spring, should be supported on the inner surface of the compressed air connection connected to the housing.

To securely fix the spring element, this surrounds the longitudinal leg of the second section of the piston, which preferably has a T-geometry in longitudinal section as mentioned above.

In order to exclude the possibility of compressed air escaping between the pin element and the coupling or the inside thereof, the invention provides in particular that a second seal runs parallel to the first seal in the inner surface of the housing, by means of which the pin element can be sealed off from the housing, wherein the distance between the contact surface for the first seal, specifically in the region on which the first seal rests when the coupling is locked, and the second seal is fixed in such a way that, when the first seal engages with the contact surface, the contact surface between the piston and the pin element runs between the contact surface, i.e. the contact region of the first seal on the contact surface, and the second seal. This ensures that false air cannot escape when the coupling is open, i.e. when the piston is moved in the direction of the compressed air connection against the force caused by the spring element by means of the pin element in order to space the first seal from the contact surface. The sealing of the second seal always acts until the first seal shows the desired sealing effect. In this position of the piston, compressed air can no longer flow through the radial openings and the piston channel.

Furthermore, a third seal is provided to provide a seal between the outer surface of the housing and the section of the air motor that receives the coupling.

As mentioned, the invention is also characterized in particular by the fact that at least one exhaust air connection to an exhaust air opening of the air motor runs in the housing, i.e. its wall. This at least one exhaust connection opens into a first hose connected to the housing of the coupling. Inside the first hose runs a second hose leading to the compressed air connection.

It is also an object of the invention to provide an air motor with a coupling, having one or more of the features previously explained.

BRIEF DESCRIPTION OF THE DRAWINGS

Further details, advantages and features of the invention result not only from the claims, from the features to be taken from these—individually and/or in combination—but also from the following description of preferred embodiment examples.

Showing.

DESCRIPTION OF THE PREFERRED EMBODIMENTS

With the aid of the figures, the teaching according to the invention will be described, which relates to couplings for connecting an air source to an air motor or an air motor with a coupling.

Figure 1:
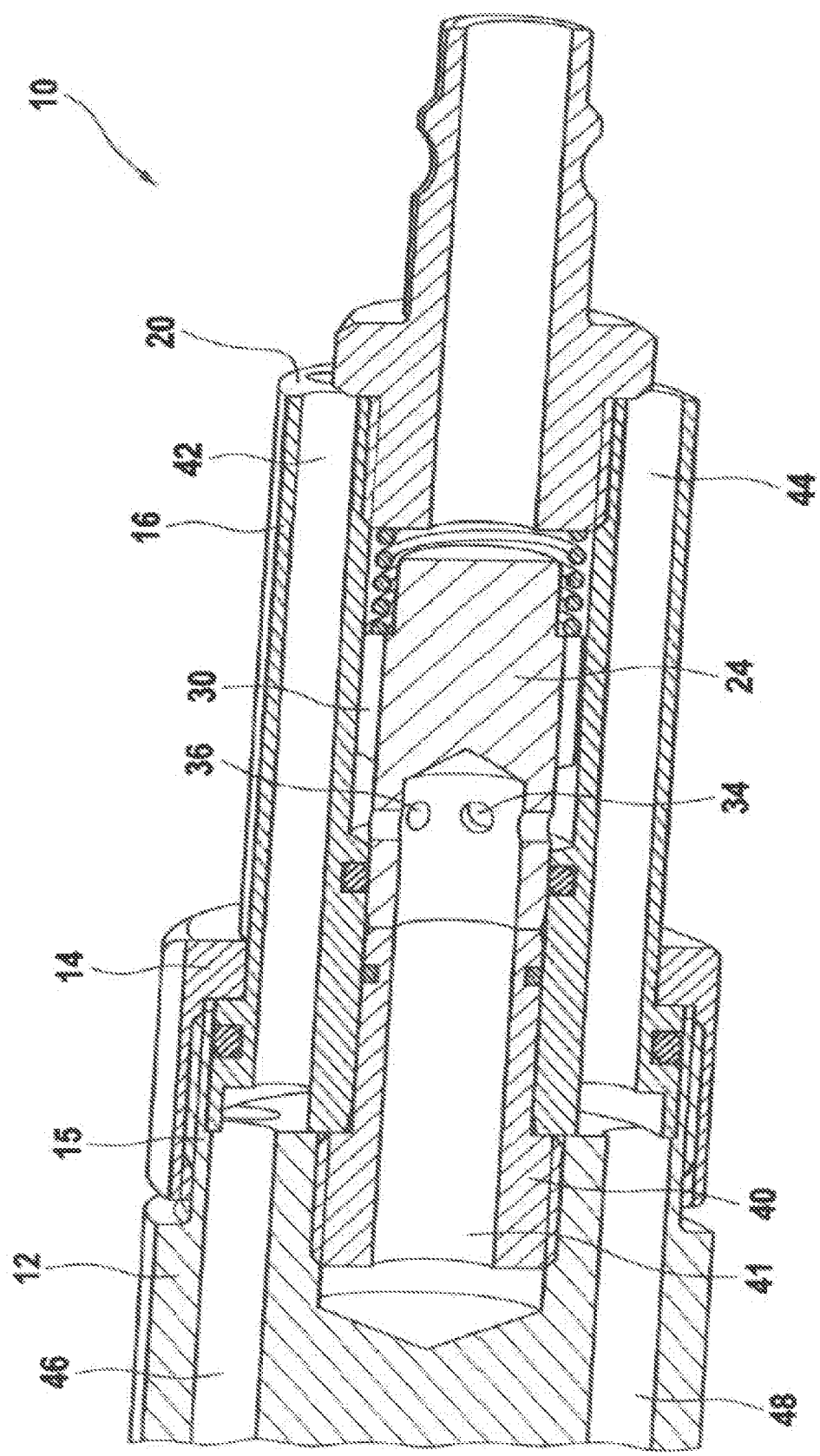
FIG. 1 a first embodiment of a quick coupling screwed onto an air motor.
Figure 2:
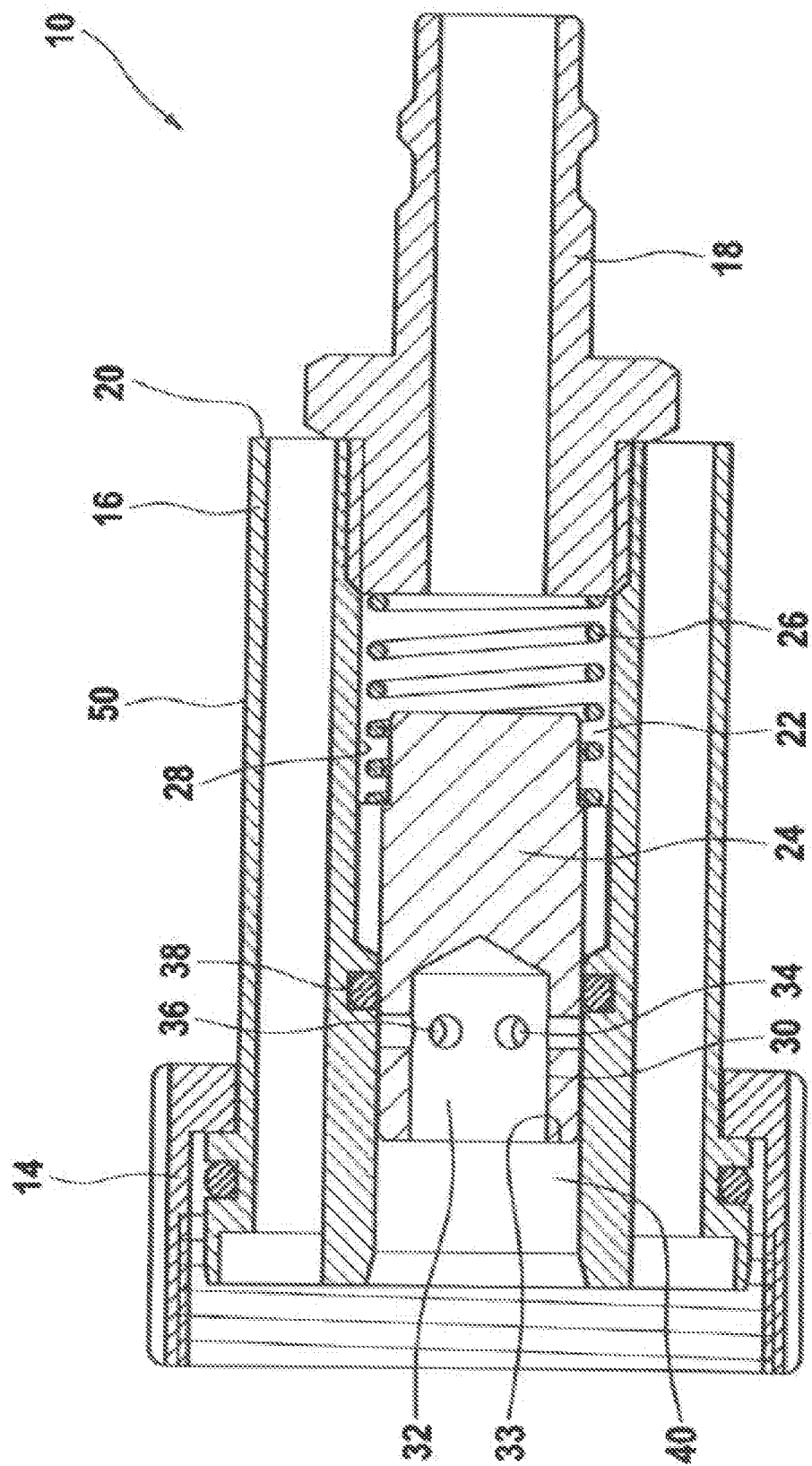
FIG. 2 the quick coupling according to FIG. 1.

In a first embodiment according to FIGS. 1 and 2, a coupling 10, which may be referred to as a quick coupling, is connected to a section 12 of an air motor via a coupling nut 14, as can be self-explanatorily seen in FIG. 1. The coupling 10 includes a housing 16 having a journal-shaped connection 18 connectable thereto for a connecting element generally referred to as a hose, which leads to a source of compressed air to supply compressed air to the air motor. The connection 18 extends centrally from the front region 20 of the housing 16, which may also be referred to as the distal region with respect to the air motor.

The connection 18 opens into an inner space 22 of the housing 16, to be designated as a housing channel, in which a piston 24 is adjustable in the longitudinal axis direction of the housing 16, which is force-loaded in the direction of the proximal region of the housing 16, i.e. the region of the connection with the air motor, by means of a spring, such as a helical spring 26.

The piston 24 extends with a section on the pressure connection side at a distance from the inner wall 28 of the inner space 22, so that there is an annular space 30 in which the compressed air is present or through which the compressed air can flow. The adjoining section of the piston 24, which runs on the air motor connection side, is guided axially in the housing 16, as is likewise self-explanatory from the Figs.

The piston 24 has a central recess, such as a bore 32, in its region 30 near the air motor, which can also be described as a piston channel, from which radially extending openings 34, 36 extend, which pass peripherally through the piston 24, as is likewise self-explanatory from the diagrammatic representation.

The piston 24 is sealed from the inner wall 28 by at least one circumferential seal 38, which either blocks (FIG. 2) or releases (FIG. 1) a connection between the openings 34, 36 and the annular space 30, depending on the position of the piston 24. The latter is the case when the coupling 10 is connected to the air motor 12 by means of the coupling nut 14 and the piston 24 is displaced in the direction of the distal region, i.e. the end region 20, of the housing 16 against the spring force and compressed air acting on it. This is made possible by the fact that a pressure element, such as a pin element or pin 40, originates from the air motor 12 and extends in or through the connection 15 of the air motor 12, onto which the coupling nut 14 is screwed, in such a way that, when the coupling 10 is connected to the air motor 12, the pressure element or pin 40 interacts with the motor side end region 33 of the piston 24 in such a way that the latter is displaced in the direction of the distal region of the housing 16, i.e. the spring 26 is compressed accordingly, as can be seen from FIG. 1. In this second position, the openings 34, 36 are connected to the annular space 30 so that compressed air can flow through the openings 34, 36 and 41, the bore 32 in the piston 24 and an in this merging axially extending recess like a bore in the pressure element 40 and is connected to the air motor for actuating it. The bore 41 can also be referred to as a connecting channel.

Instead of the pin 40, another design solution may be provided to adjust the piston 24 when the quick coupling 10 is connected to the air motor. In this respect, pressure element or pin 40 is to be understood as a synonym for corresponding possible solutions.

If the coupling 10 is disassembled, i.e. moved to the right in the diagrammatic representation of FIG. 1, the force acting on the piston 24 causes it to be displaced in the housing 16 in such a way that the openings 34, 36 are located between the proximal region of the housing 16 and the seal 38, in the so-called first position, so that the connection to the annular space 30 is interrupted and thus compressed air can no longer flow through the bore 32 in the direction of the air motor 12.

It is further apparent from the diagrammatic representations that within the housing 16, and specifically in the embodiment example, two channels or bores 42, 44 are provided extending in the longitudinal direction of the housing 16, which are connected to or merge with exhaust bores 46, 48 of the air motor 12 when the coupling 10 is connected thereto. The channels 42, 44 pass through the end face region of the housing 16 so that when the peripheral wall 50 of the housing 16 is surrounded by a hose, the exhaust air can then be discharged. In this case, the corresponding hose initially coaxially surrounds the hose connected to the compressed air source and extending from the journal section 18. The hose carrying the exhaust air can be connected to a muffler to reduce the noise level.

The coupling 10 is preferably made of stainless material such as steel, so that hygiene requirements can also be met in this respect.

Another seal is located between the coupling nut 14 and the housing 16 of the coupling 10. Also, a seal extends between the pressure element 40 and the inner wall 28 of the housing 16.

Figure 3:
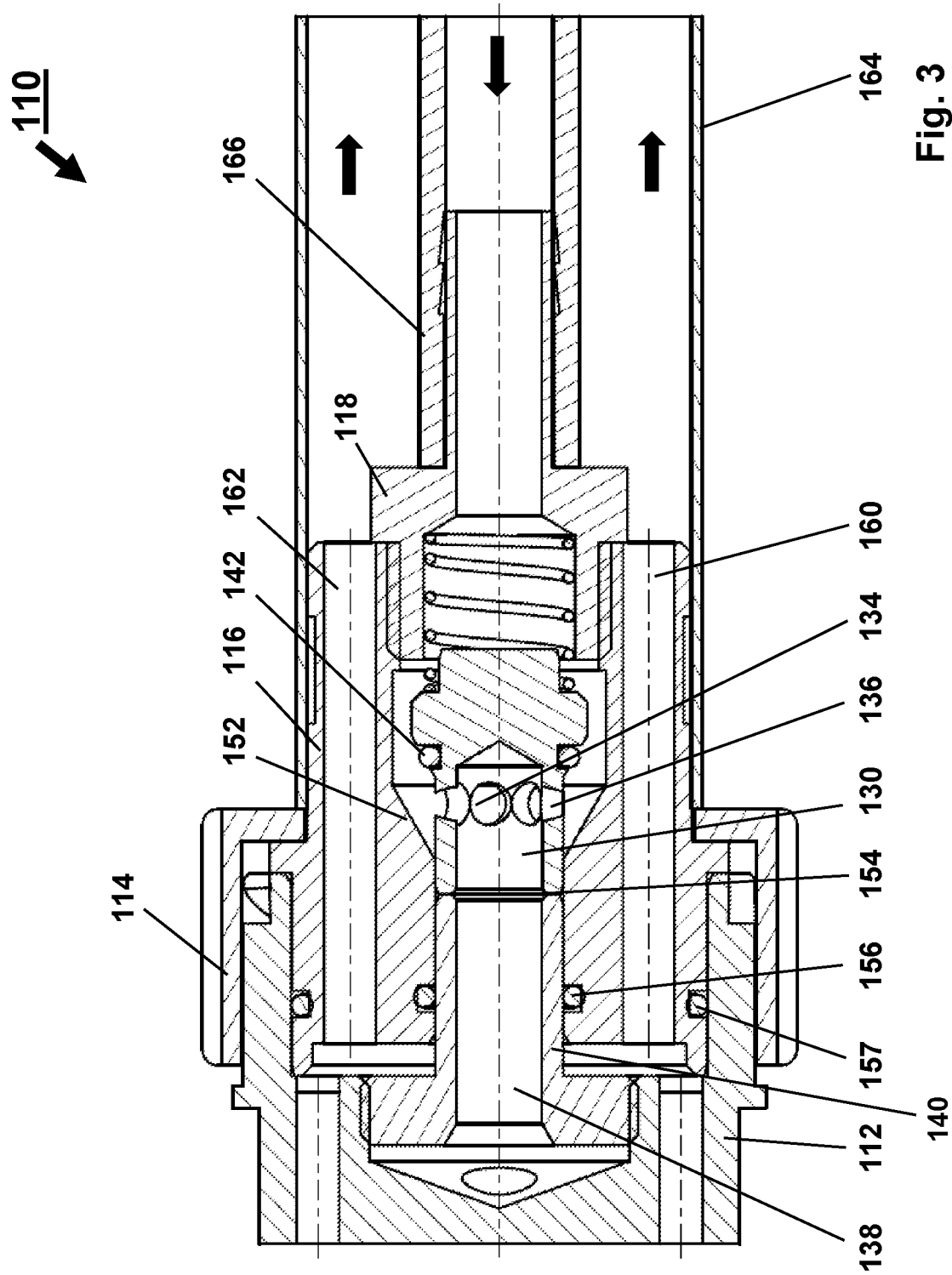
FIG. 3 a second embodiment of a variably positionable coupling connected to an air motor, and FIG. 4 the coupling according to FIG. 3 with spaced air motor.
Figure 4:
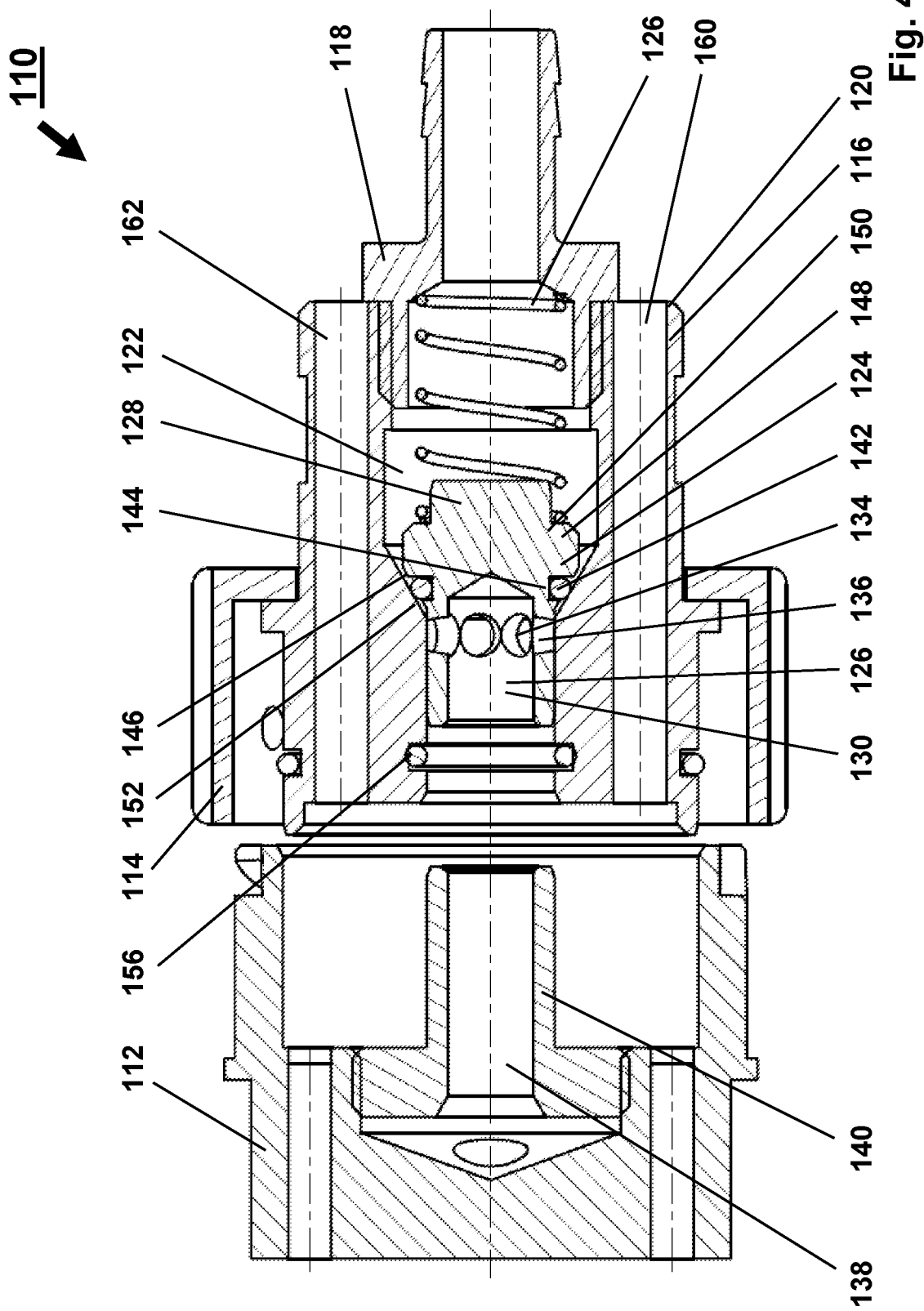
Figure 5:
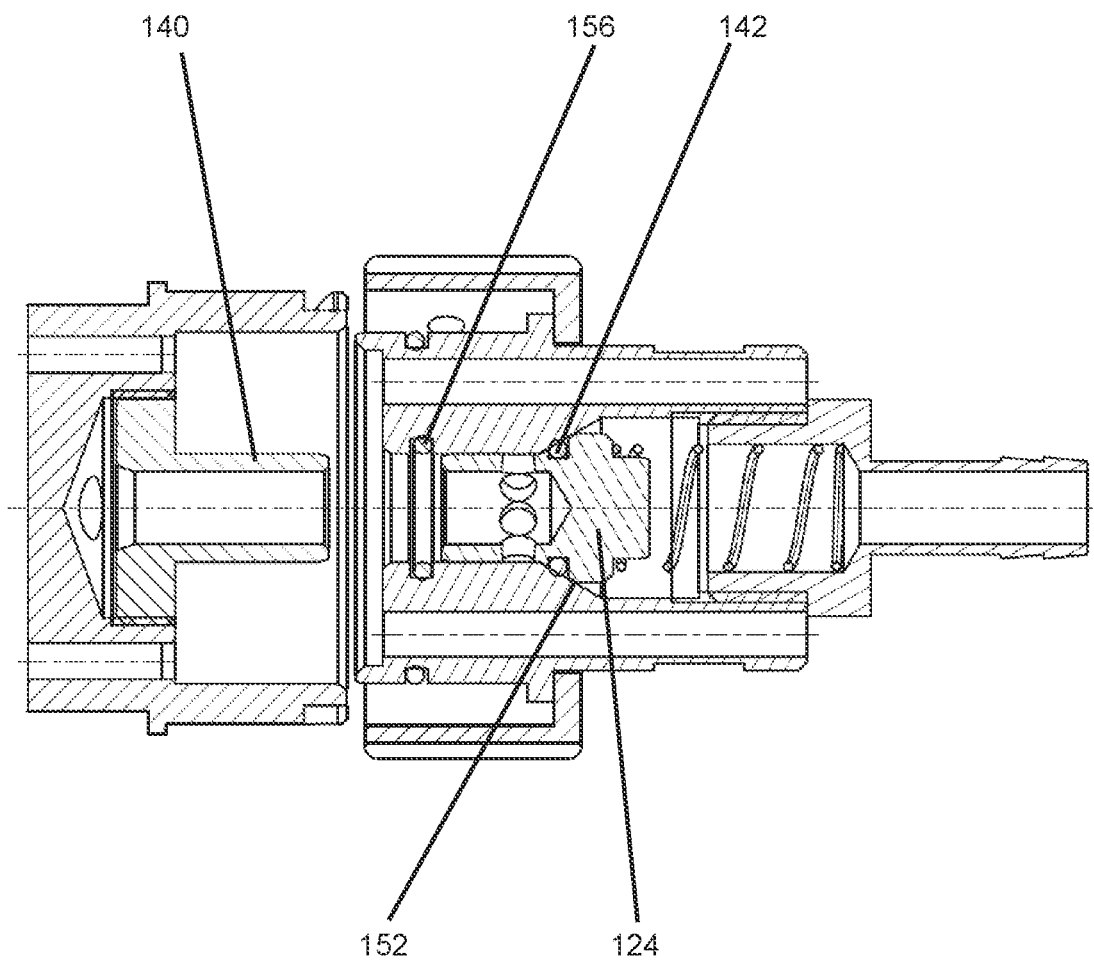
FIG. 5 an embodiment of the invention showing an open coupling.
Figure 6:
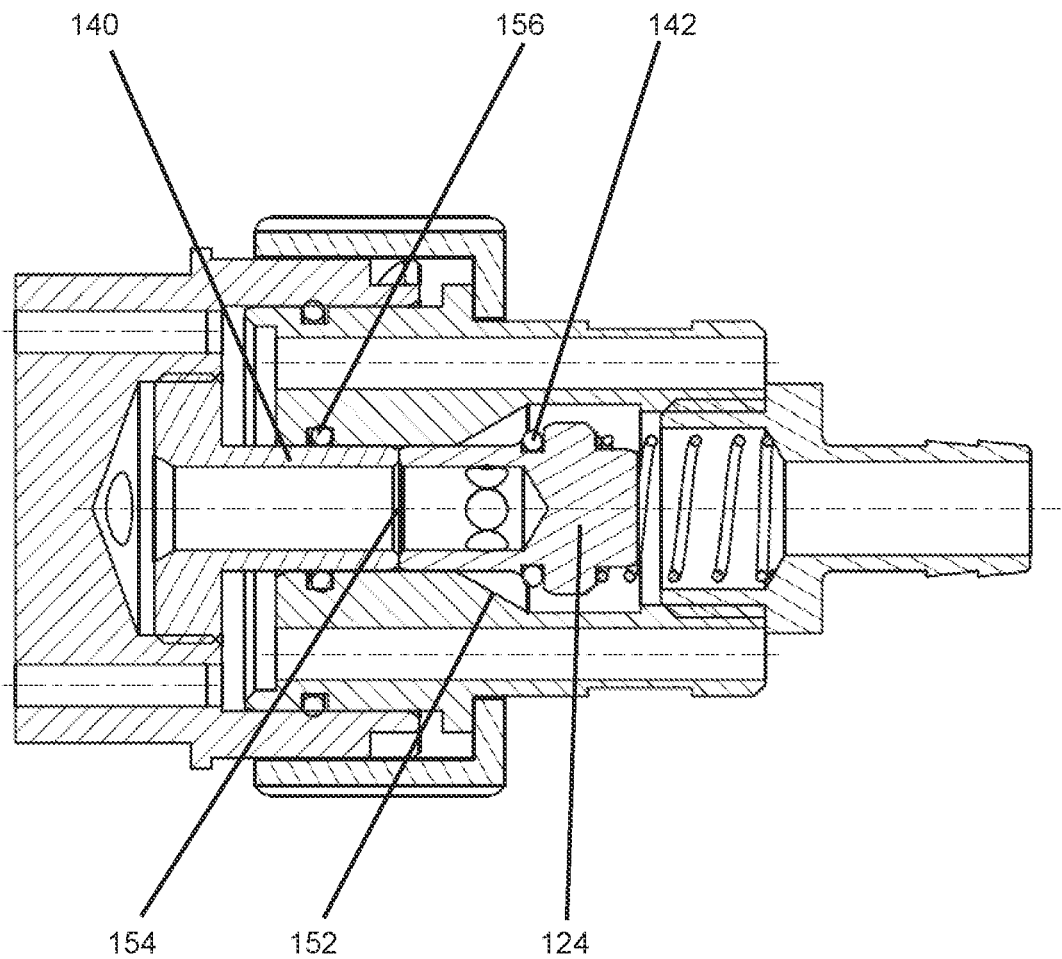
FIG. 6 an embodiment of the invention showing a closed coupling and impact surface.

FIGS. 3 and 4 show a particularly noteworthy embodiment of a coupling 110 which can be used in particular for an air motor in the food industry, without this being intended to restrict the teachings of the invention. Independently of this, the coupling 110—like the coupling 10—is not location-bound, so that a connection to air motors can be made without any problems, which are operated by hand, for example. In this case—as in the embodiment example of FIGS. 1 and 2—the coupling is directly connected to an air motor or a section 112 of the air motor.

To connect the section 112, a coupling nut 114 is provided to receive the section 112 and extend from the coupling 100, as illustrated in the diagrammatic representations.

A compressed air connection 118 can be connected to the housing 116 of the coupling 110, which in particular passes through the end face 120 of the housing 116 and can be screwed into it. In this region, the housing 116 is formed such that an inner space, to be referred to as the housing channel 122, is formed through which compressed air can flow through the coupling 110 to the air motor in a proximate manner via the connection 118.

Within the housing channel 122 and adjustable in the axial direction is a piston 124, which is force-loaded towards the proximal region of the coupling 110 by means of a spring element 126, preferably in the form of a helical spring, i.e. in the direction of the region in which the air motor or the section 112 is connected to the coupling 110. The opposite end region 120 may be referred to as the distal region of the coupling 110.

The piston 124 comprises a first section 126 of cylindrical geometry and a second section 128 having a T-geometry in longitudinal section. In the first section 126 runs a central bore, to be referred to as piston channel 130, which in its bottom region merges into radially extending openings 134, 136, which pass through the piston wall to allow, depending on the position of the piston 124, either compressed air to flow through the connection 118, the housing channel 122 and the piston channel 130 to a connecting channel 138 extending in the section 112 for actuating the air motor, which channel extends within a hollow pin—also called pin element 140—or to shut off the compressed air (FIG. 4) when the coupling 110 is disconnected from the air motor. To this end, a first seal 142 is provided extending in the transition region between the first section 126 and the second section 128 of the piston 124, namely in a groove 144.

Here, the first seal 122 engages with the proximal outer surface 146 of the transverse leg 148 of the second section 128 of the piston 124. The opposite distal outer surface 150 of the transverse leg 146 is supported by one end of the spring 126. The opposite end is supported on the inside of the compressed air connection 118, which can be screwed into the housing 116.

The first seal 142 is associated with a contact surface 152 in the inner wall of the housing 116 of the coupling 110, against which the first seal 142 engages when the flow of compressed air is to be shut off, i.e., when the air motor is disconnected from the coupling 110. In this case, the spring 126 acts on the piston 124 in such a way that the piston 124 is displaced in the direction of the air motor connection side area to such an extent that the first seal 142 is in sealing contact with the contact surface 152. Since the radially extending openings 134, 136 of the piston 124 are located between the proximal region of the housing 116, i.e. the end face extending on the air motor side, and the contact surface 142 when the first seal 142 is in contact with the contact surface 152, compressed air cannot flow via the openings 134, 136.

If, in accordance with FIG. 3, the coupling 110 is connected to the section 112 of the compressed air motor, the journal 140 acts with its end face on the facing end face of the first section 126 of the piston 124 with the result that, when the piston 124 is moved axially—by turning the coupling nut 114—in the direction of the compressed air connection 118, the force caused by the spring 126 is overcome and thus the first seal 142 is spaced from the contact surface 152. At the same time, the radially extending openings 134, 136 enter the region of the housing channel 122 in which the contact surface 142, which has a cone geometry, extends with the result that compressed air can flow through the housing channel 130 and the openings 134, 136 into the connecting channel 138 and thus to the air motor. The connecting channel 138 extends in the pin 140, which can also be referred to as a sleeve. The impact surface between the pin 140 and the first portion 126 of the piston 124 is indicated by reference number 154 in FIG. 3.

A second seal 156 is recessed in the inner wall of the housing 116, via which the housing 116 is sealed from the journal 140, until the first seal 142 sealingly engages the contact surface 152. Accordingly, the distance between the second seal 156 and the contact surface 152 is matched with respect to the length of the piston 124 and thus the impact surface 154 with respect to the distance between the first seal 142 and the impact surface 154.

A third seal 57 seals the section 122 from the housing 116, preferably recessed in the housing wall.

As in the embodiment example in FIGS. 1 and 2, exhaust air channels 160, 162 extend inside the housing wall, through which air recirculated from the air motor can flow. The exhaust air is directed away from a hose element 164 that surrounds the housing 116. A hose 166 connected to the compressed air connection 118 extends within the corresponding hose 164.

Thus, couplings 10, 110 are available to provide a compressed air supply and an exhaust air supply. The noise level when using the air motor is reduced at the same time, especially when the exhaust air is led away via a hose, e.g. 3 meters long, and then passes through a muffler.

To reduce noise, it is provided in particular that the first hose element 164, i.e. the hose via which the exhaust air is led away, opens into a housing which is made in particular of plastic. The supply air hose 166 carrying the compressed air is passed through the center of the housing in particular and sealed with an O-ring. The exhaust air coming out of the exhaust hose can escape through mufflers mounted in or on the housing.

The invention relates to a coupling 10, 110 for connecting a compressed air source to an air motor, comprising a housing 16, 116 with a housing channel leading to a compressed air connection 18, 118, a piston 24, 124 axially adjustable in the housing channel 22, 122 and force-loaded by a spring element 26, 126, having an axially extending piston channel 30, 130132 which, when the coupling is connected to the air motor, merges into a connecting channel 41, 138 present in a pin element 40, 140 of the air motor, wherein the piston is adjustable in the direction of the compressed air connection by means of the pin element against the application of force by the spring element, wherein in the absence of interaction between the pin element and the piston, the piston is in a first position due to the application of force by the spring element, in which the housing channel is shut off with respect to the piston channel by means of a first seal 38, 142 extending between the piston and the housing channel, and, with the coupling connected to the air motor, in a second position of the piston there is a compressed air connection between the housing channel, the piston channel and the connecting channel, wherein the coupling is characterized in that the spring element 26, 126 extends between the compressed air connection 18, 118 and the compressed air connection side area of the piston 24, 124, in that radially extending openings 34, 36, 134, 136, via which the compressed air flows in the second position of the piston, extend from the compressed air connection side area of the piston channel 30, 130 and in that at least one exhaust air channel 42, 44, 160, 162, which is connected to the compressed air motor, extends in the wall of the housing 16, 116 and passes through the wall in its compressed air connection side area, in particular the end face of the housing.

In particular, the invention relates to a coupling 10, 110 for connecting a compressed air source to an air motor, comprising a housing 16, 116 with a housing channel leading to a compressed air connection 18, 118, a piston 24, 124, axially adjustable in the housing channel 22, 122 and force-loaded by a spring element 26, 126 having an axially extending piston channel 30, 130 which, when the coupling is connected to the air motor, merges into a connecting channel 41, 138 present in a pin element 40, 140 of the air motor, wherein the piston is adjustable in the direction of the compressed air connection by means of the pin element against the application of force by the spring element, wherein, in the absence of interaction between the pin element and the piston, the piston is in a first position as a result of the application of force by the spring element, in which first position the housing channel is shut off with respect, to the piston channel by means of a first seal 38, 142 extending between the piston and the housing channel, and, with the coupling connected to the compressed air motor, in a second position of the piston there is a compressed air connection between the housing channel, the piston channel and the connecting channel, wherein the coupling is characterized in that the piston 24, 124 has a first section 126 running on the compressed air motor side and a second section 128 running on the compressed air connection side, in that the first section has a cylinder geometry on the outside and the piston channel 130 runs inside it, in that the second section has a larger cross section compared to the first section and runs at a distance from the inner surface of the housing channel 122, in that the spring element 126 is supported on the one hand on the compressed air connection side, in particular on the compressed air connection 118, and on the other hand on the first section in that a first seal 142 runs in the second section or in the transition region between the first and second sections, in that the housing channel has an contact surface 152, in that the first seal engages the contact surface in the absence of interaction between the pin element 140 and the piston and in that the piston channel has, in its compressed air connection side area, radially extending openings 134, 136 which extend with respect to the contact surface in such a way that, when the seal is not engaged with the contact surface, there is a connection between the housing channel and the piston channel, and when the seal is engaged with the contact surface, the connection is blocked.

In particular, the invention provides that the contact surface 152 has a cone shape.

It is further provided that the first section 126 transitions into the second section 128 via a groove 144 in which the first seal 142 extends.

Also, the invention is characterized in that the second section 128 has a T-shape in longitudinal section with a transverse leg 148, wherein the spring element, such as a helical spring, is preferably supported on the one hand on compressed air connection side face 146 of the transverse leg and on the other hand on inner surface of the compressed air connection 118 connected to the housing 116.

Preferably, it is provided that the housing channel 122 has in its inner side a circumferential second seal 156 running parallel to the first seal 142, via which the pin element 140 can be sealed with respect to the housing channel 122, wherein the distance between the contact region of the first seal on the contact surface 152 and the second seal is defined in such a way that, when the first seal bears against the contact surface, the impact surface 154 runs between the piston 124 and the pin element between the contact surface and the second seal.

The invention is also characterized in that at least one exhaust air connection 160, 162, such as a channel or bore, extending from the air motor extends in the wall of the housing 116 and passes through the compressed air connection side area of the wall, in particular its end face 120.

The invention is further characterized in that the housing 16, 116 is connected to a first hose element 164 into which the at least one exhaust connection opens.

In particular, the invention is characterized in that from the end region of the housing 16, 116 remote from the compressed air motor connection originates the compressed air connection 18, 118, which is designed in such a way that a second hose element 166 can be connected thereto, which is surrounded in regions by the first hose element 164.

Also characteristic of the invention is that the first hose element 164 is formed or connected to a device to be connected to a muffler.

More preferably, the first hose element 164 has a length of at least 200 cm, preferably of at least 300 cm.

In particular, the first hose element 164 opens into a housing preferably made of plastic. In this, the exhaust air exits the first hose element 164 and then passes through mufflers mounted on or in the housing. This results in a considerable reduction in noise.

Furthermore, the hose 166 supplying the compressed air is passed through the housing and sealed with respect thereto via, for example, an O-ring. Thus, coaxial routing of the compressed air hose 166 and the exhaust air hose 164 is possible in a simple manner.

In particular, the invention provides that the coupling 10, 110 is not stationary, but rather connectable to an air motor at a desired location.

Also, the invention features an air motor with a coupling characterized by at least some of the features previously described.

The invention claimed is:

1. A coupling for connecting a compressed air source to an air motor, comprising:
    a housing with a housing channel leading to a compressed air connection, a piston axially adjustable in the housing channel and force-loaded a spring element, having an axially extending piston channel which, when the coupling is connected to the air motor, merges into a connecting channel present in a pin element of the air motor, wherein the piston is adjustable in the direction of the compressed air connection by means of the pin element against the application of force by the spring element, wherein, in the absence of interaction between the pin element and the piston, the piston is in a first position due to the application of force by the spring element in which the housing channel is shut off with respect to the piston channel by means of a first seal extending between the piston and the housing channel, and, with the coupling connected to the air motor, in a second position of the piston, there is a compressed air connection between the housing channel, the piston channel, and the connecting channel,
    wherein the piston has a first section extending on the compressed air motor side and a second section extending on the compressed air connection side,
    wherein the first section has a cylinder geometry on the outside and the piston channel runs inside it,
    wherein the second section has a larger cross section relative to the first section and is spaced apart from the inner surface of the housing channel,
    wherein the spring element is supported on the compressed air connection side, and on the first section,
    wherein the first seal extends in the second section, or in the transition region between the first and second sections,
    wherein the housing channel has a contact surface,
    wherein the first seal engages with the contact surface in the absence of interaction between the pin element and the piston,
    wherein a compressed air connection side area of the piston channel has radially extending openings which run with respect to the contact surface in such a way that, when the seal is not engaged with the contact surface, there is a connection between the housing channel and the piston channel, and when the seal is engaged with the contact surface, the connection is blocked, and
    wherein an inner side of the housing channel has a circumferential second seal running parallel to the first seal, via which the pin element can be sealed with respect to the housing channel, wherein the distance between a contact region of the first seal on the contact surface and the second seal is defined in such a way that, when the first seal bears against the contact surface, an impact surface runs between the piston and the pin element between the contact surface and the second seal.

2. The coupling according to claim 1, wherein the contact surface has a cone shape.

3. The coupling according to claim 1, wherein the first section merges into the second section via a groove in which the first seal runs.

4. The coupling according to claim 1, wherein the second section has a T-shape in longitudinal section with a transverse leg, wherein the spring element is supported on the compressed air connection side face of the transverse leg, and on the inner surface of the compressed air connection connected to the housing.

5. The coupling according to claim 1, wherein at least one exhaust air connection, which starts from the air motor, runs in the wall of the housing and passes through the compressed air connection side area of the wall.

6. The coupling according to claim 5, wherein the at least one exhaust air connection passes through an end face of the wall.

7. The coupling according to claim 5, wherein the at least one exhaust air connection of at least one exhaust air connection is a channel or bore.

8. The coupling according to claim 1, wherein the housing is connected to a first hose element into which the at least one exhaust air connection opens.

9. The coupling according to claim 8, wherein the compressed air connection starts from the end region of the housing remote from the compressed air motor connection, wherein the compressed air connection is configured so that a second hose element is connectable to the compressed air connection, wherein the second hose element is surrounded in regions by the first hose element.

10. The coupling according to claim 9, wherein the second hose element is passed through the housing and sealed with respect thereto.

11. The coupling according to claim 8, wherein the first hose element is formed or connected to a device to be connected to a muffler.

12. The coupling according to claim 8, wherein the first hose element has a length of at least 200 cm.

13. The coupling according to claim 12, wherein the first hose element has a length of at least 300 cm.

14. The coupling according to claim 8, wherein the first hose element opens into a housing provided with a muffler through which the exhaust air passes.

15. The coupling according to claim 1, wherein the coupling is a variably positionable coupling.

* * * * *